United States Patent
Wollenhaupt

(10) Patent No.: US 6,216,614 B1
(45) Date of Patent: Apr. 17, 2001

(54) BOOM DISPENSING POINT CONTROL SYSTEM

(75) Inventor: Nyle C. Wollenhaupt, Chaska, MN (US)

(73) Assignee: Ag-Chem Equipment Co., Inc., Minnetonka, MN (US)

( * ) Notice: Subject to any disclaimer, the term of this patent is extended or adjusted under 35 U.S.C. 154(b) by 0 days.

(21) Appl. No.: 09/301,146

(22) Filed: Apr. 28, 1999

(51) Int. Cl.[7] ............ G05B 15/00; A01C 15/00; A01C 21/00
(52) U.S. Cl. ............ 111/118; 111/900; 701/50
(58) Field of Search ............ 701/50; 111/118, 111/14, 123, 127, 200, 900

(56) References Cited

U.S. PATENT DOCUMENTS

| | | | |
|---|---|---|---|
| Re. 35,100 | 11/1995 | Monson et al. | 111/130 |
| 4,630,773 | 12/1986 | Ortlip | 239/1 |
| 4,717,077 | 1/1988 | Takata | 239/548 |
| 4,964,575 | 10/1990 | Takata | 239/655 |
| 5,028,009 | 7/1991 | Takata | 239/655 |
| 5,220,876 | 6/1993 | Monson et al. | 111/130 |
| 5,355,815 | 10/1994 | Monson | 111/200 |
| 5,453,924 | 9/1995 | Monson et al. | 364/131 |
| 5,689,418 | 11/1997 | Monson | 364/420 |
| 5,721,679 | * 2/1998 | Monson . | |
| 5,751,576 | 5/1998 | Monson | 364/188 |
| 5,757,640 | 5/1998 | Monson | 364/131 |
| 5,878,371 | 3/1999 | Hale et al. | 702/5 |
| 5,884,224 | 3/1999 | McNabb et al. | 702/2 |
| 5,887,491 | 3/1999 | Monson et al. | 74/864.74 |

OTHER PUBLICATIONS

Tom Doerge, Defining Management Zones for Precision Farming, 1998, pp. 1–6.
John Dignan, Maintaining Control, Jan. 1999, pp. 49–50.

* cited by examiner

*Primary Examiner*—Christopher J. Novosad
(74) *Attorney, Agent, or Firm*—Kinney & Lange, P.A.

(57) ABSTRACT

A crop input applicator system for controlling the application of crop inputs from each dispensing point. The applicator is equipped with a locating system and an on-board computer. The on-board computer uses location data collected from the locating system, along with machine signature data, and application maps to create status maps indicating the area treated by crop inputs. The computer compares the status map to the current location of the applicator and based on the comparison automatically controls dispensing points so that those dispensing points over an area previously treated are deactivated, while dispensing points over an area not yet treated remain active.

35 Claims, 8 Drawing Sheets

BOOM DISPENSING POINT CONTROL SYSTEM

CROSS-REFERENCE TO RELATED APPLICATION(S)

None.

BACKGROUND OF THE INVENTION

The present invention relates to dry and liquid crop input applicator dispensing systems used in site specific farming. More particularly, the invention relates to a control system for controlling dispensing points on a crop input applicator based on location data, such as that received from a global positioning system (GPS), so that the dispensing points on the applicator are automatically deactivated when the applicator overlaps an area previously treated with crop inputs.

To compete in the global economy, farmers have been forced to become as cost effective as possible. In doing so, farmers have increasingly turned to high technology in the form of site specific farming. Site specific farming involves using global positioning information, coupled with site specific soil or crop data to aid a farmer in applying the correct type of crop inputs in the correct amount at the correct location in a field. To do so, soil or crop data is collected, usually by either soil sampling or some type of sensing, and maps are generated to show the soil and crop conditions of a particular land area or field. These maps aid in determining the amount and placement of crop inputs needed to maximize crop production. Using this information, a farmer can use modern crop input applicators, which are equipped with an on-board computer and a GPS receiver, to apply the crop inputs in precise amounts at the precise desired location.

Liquid and dry air boom type crop input applicators have been used to apply a variety of crop inputs, such as fertilizer, nutrients, seed, and crop protectants, in site specific farming applications. Examples of such applicators are the Terra-Gator®, manufactured by Ag-Chem Equipment Co, Inc., of Minnetonka, Minn., the RoGator®, also manufactured by Ag-Chem Equipment Co, Inc., and the Liqui-Max®, manufactured by Lor*Al Products, Inc., a wholly owned subsidiary of Ag-Chem. While the above vehicles accommodate site specific farming practices, the present inventors have realized that such vehicles, and many other crop input applicators, can be configured to further enhance site specific farming practices.

Site specific farming emphasizes variable rate application of crop inputs. "Application maps" are the blue prints that determine the level and location of crop inputs to be applied to particular management zones in the field. The maps also provide the required variable rate input data necessary to automatically vary input rates using a controller, thereby removing the need for an operator to manually vary the input rates. A limitation of such application maps however, is that each time the planter vehicle or any other type of application vehicle traverses a particular management zone, the associated variable rate input controller will deliver crop inputs in response to the same application map, even if the area was just treated by the controller. In systems capable of creating as-applied maps, the maps dramatically draw attention to the areas in the field that are either skipped or covered twice by overlapping. Multiple applications caused by overlaps are particulary prevalent in irregularly shaped fields and fields with waterways or terraces.

Present methods of eliminating such undesirable overlaps or skips include manual on-off operator control of boom sections or dispensing points. Manual methods are generally inaccurate because they rely on the vehicle operator to determine if the dispensing points are located over a previously applied area and to decide when some or all dispensing points on the crop input applicator must be turned on or off. Such manual methods are made more unreliable due to operator error created by long hours, physical exhaustion, and the sense of urgency under which many operators work. Visibility constraints due to weather, lighting, and dust; variations in operator response times during varying speeds and directions; and errors in judgment all result in undesirable overlaps and skips. Beyond just misapplication of expensive crop inputs, these skips and overlaps also cost farmers in terms of lack of pest or weed control, crop damage, and carry-over crop damage. In addition, when applying chemicals or other types of regulated crop inputs, an overlap may result in areas being over sprayed. Over spray areas are off label, and may even be subject to legal action.

Thus a need exists in the farming industry to provide a crop input applicator vehicle that can reliably activate and deactivate booms, boom sections, planter boxes, drill sections, and individual dispensing points along the applicator in a manner that will prevent multiple applications and skips intentionally or unintentionally created when the applicator covers an area already treated. If such activation were automatic, and not dependent on operators who may be susceptible to error, the applicator control system would be a significant improvement in the art.

BRIEF SUMMARY OF THE INVENTION

The present invention is directed to a dispensing point control system that is configured to prevent inadvertent multiple application (overlaps) and skips from crop input applicators. Such multiple applications and skips are especially prevalent when crop input applicator vehicles are applying crop inputs to irregularly shaped fields or fields that contain water ways and terraces. In one embodiment, a GPS locating system used in connection with a computer automatically creates real time status maps depicting the areas where crop inputs have been applied by the applicator. The computer also uses location data from the locating system to compare the present location of the applicator to the status map. Based on this comparison, the computer activates those dispensing points that traverse areas where crop inputs have not yet been applied, and deactivates those dispensing points that traverse areas where crop inputs have already been applied.

The present control system is used with a crop input applicator that has individually controllable dispensing points or sections of dispensing points. Dispensing points are the points on the applicator where crop inputs are released from the applicator to the ground. When the dispensing points are individually controlled, each dispensing point can be activated or deactivated based on instructions from the control system. Similarly, when dispensing point sections are controlled, each section can be activated or deactivated based on instructions from the control system. In addition, the control system also preferably comprises: a data processing device; an input device in communication with the data processing device; algorithmic software directing the data processing device; and a data storage unit. The data processing device and data storage device typically are an on-board computer housed in the cab of the applicator. Similarly, the input device is typically a keypad or keyboard used in connection with the on-board computer.

The control system uses the data processing device to create a geo-referenced status map. To create the status map, the data processing device collects location data, machine signature data, and optionally uses an application map previously stored in the data storage unit. Using this data, the data processing device is able to create a map in real time indicating the area over which crop inputs have been applied. Directed by the algorithmic software, the data processing device is able to use the status map to automatically control individual dispensing points or combinations of dispensing points.

DETAILED DESCRIPTION

Figure 1A:
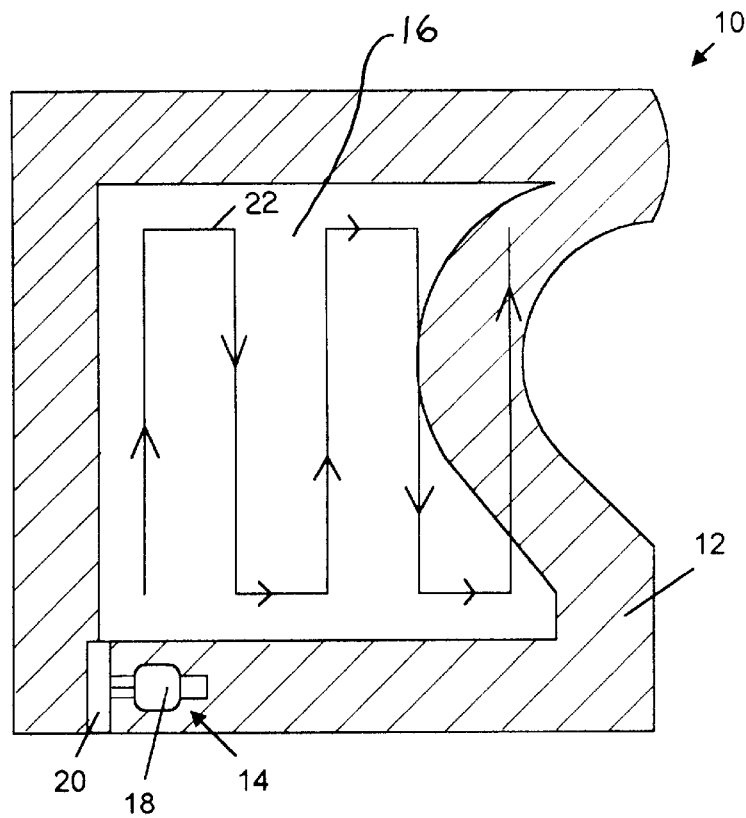
FIGS. 1A–1D are illustrations of a crop input applicator applying crop inputs to an irregularly shaped field.

FIGS. 1A–1D are illustrations of current methods for applying crop inputs. FIG. 1A depicts an irregularly shaped field 10 with a shaded area 12 illustrating the area covered by a crop input applicator 14. The unshaded area 16 indicates the area not yet covered by the applicator 14. In FIGS. 1A–1D, the crop input applicator 14 comprises a tractor 18 towing a toolbar 20. However, crop input applicators 14 are not limited to toolbars, but may also comprise sprayers, planters, drills, or other similar types of crop input applicators. The toolbar 20 may be equipped with such crop input applicators as planter boxes, anhydrous ammonia injectors, or similar devices for applying crop inputs of some kind. Once a pass around the perimeter of the field 10 has been done, a path 22 shows the route the crop input applicator 14 will travel when applying crop inputs to the rest of the field 10.

Figure 1B:
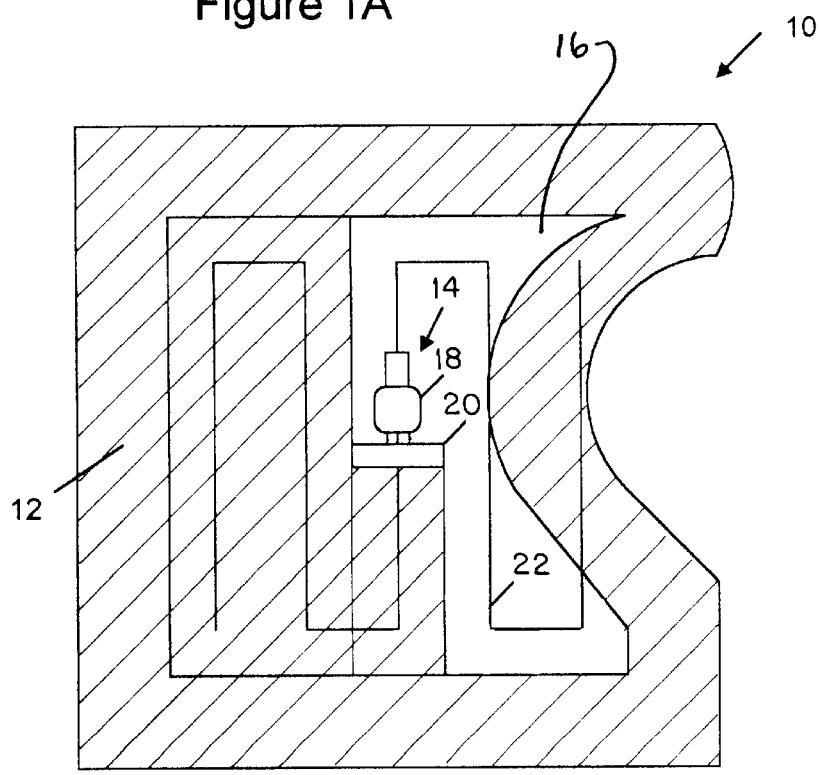
Figure 1C:
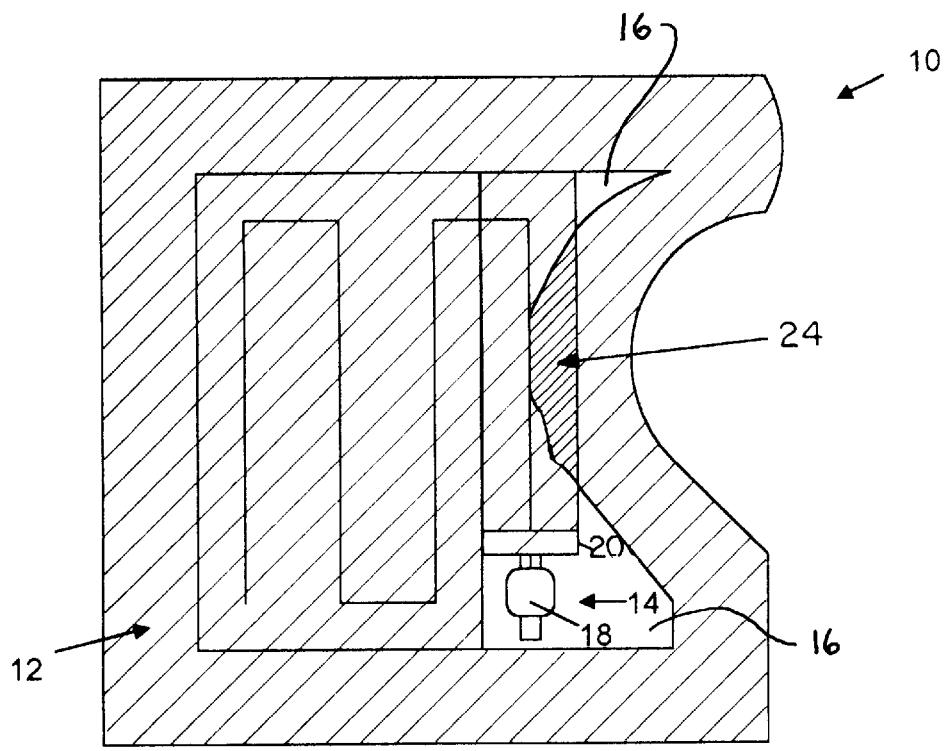
Figure 1D:
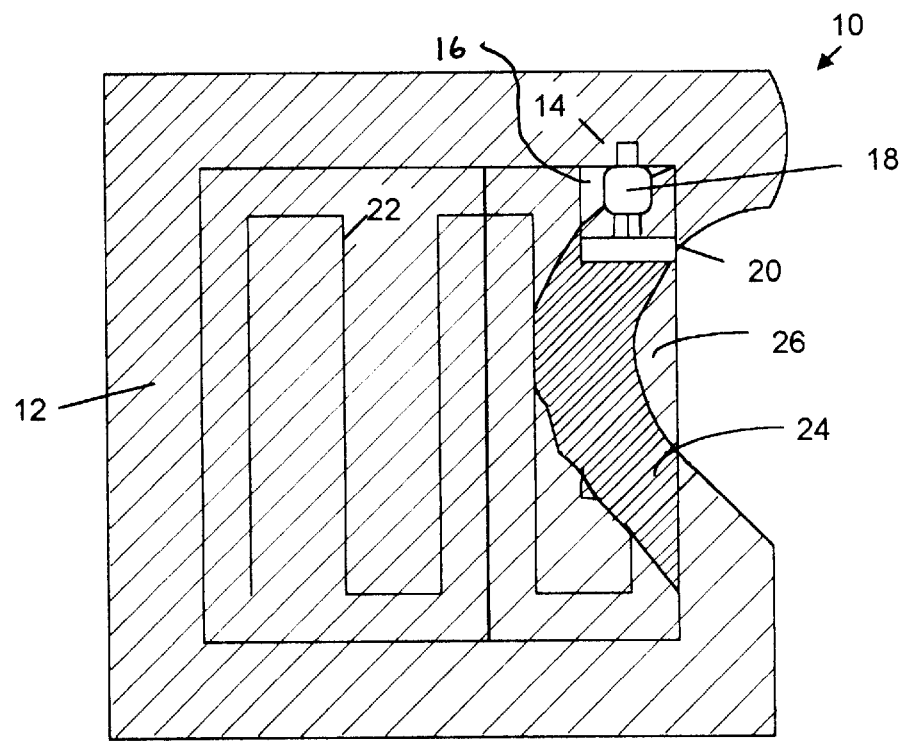

FIG. 1B illustrates the field 10 once the applicator 14 has begun traveling along the path 22 and applying crop inputs. The shaded area 12 of the field 10 covered by crop inputs has grown and as the applicator 14 moves through the field 10. FIG. 1C illustrates the progress of the applicator 14 as it continues to apply crop inputs and highlights the problem encountered when the applicator 14 reaches an irregularly shaped field 10 boundary. The applicator 14 creates an overlap area 24 when the toolbar 20 covers the area 12 previously treated with crop inputs during the perimeter pass. This overlap area 24 is increased, as shown in FIG. 1D, as the applicator 14 continues on the travel path 22. In addition, an area 26 outside the field is covered by crop inputs as the applicator 14 continues its route.

Overlap areas 24 are common not only along irregularly shaped borders, but also in more square fields and near waterways. Overlaps occur near waterways and at the edges of field boundaries because it is often necessary to bring one end of the toolbar 20 to the edge of the field or waterway, which may result in the opposite end of the toolbar 20 overlapping an already treated area. Even in more square fields, overlaps may result because after treating most of the field, only a narrow strip of untreated land area may remain, causing a portion of the toolbar 20 to overlap the previously treated land area.

Overlap areas 24 create many problems for a farmer. Crop inputs can be very expensive, and waste of the product occurs when it is applied to the same area twice. In addition, certain crop inputs are regulated by state and the federal government. Overlaps may be off label, and as such, may be a misuse of product subject to legal action. Crop inputs may not be as effective, or may even be harmful, when over applied. The present invention alleviates these concerns by controlling the crop input applicator 14 to minimize such overlapping and misapplication of crop inputs.

The present invention is a control system for controlling dispensing points on the crop input applicator 14 such that as the applicator 14 traverses an area 12 previously covered, the dispensing points on the applicator 14 are deactivated. By controlling the applicator 14 so that it does not dispense crop inputs over areas previously covered, the overlap area 24 in FIG. 1D is avoided. In addition, controlling the applicator can ensure that application of crop inputs beyond the field boundary 10, as in area 26, does not occur. Such a control system may also be used to control the application of crop inputs near waterways, wildlife areas, residential areas, or terraces.

Figure 2:
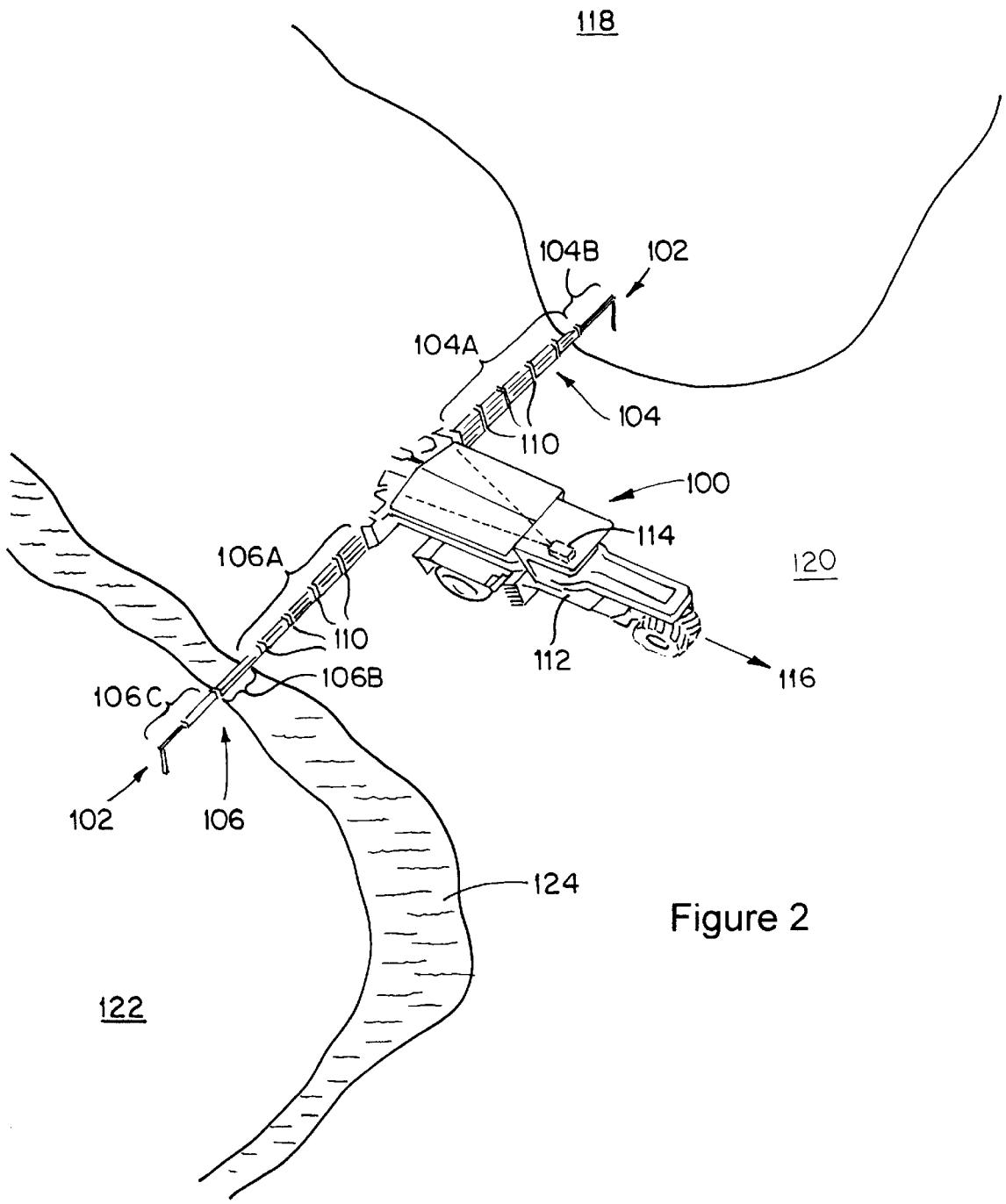
FIG. 2 is an illustration of a crop input applicator with spray booms overlapping a stream and an area previously treated with the crop inputs.

FIG. 2 is an illustration of a crop input applicator 100 implementing the present invention. The applicator 100 has a spray boom 102 overlapping a stream and an area previously treated by the crop input applicator 100. The spray boom 102 on the crop input applicator 100 has a first boom section 104 and a second boom section 106. The boom sections 104, 106 on the applicator 100 are extremely long, reaching a combined width of up to 90 feet. Along the spray boom 102 are located several dispensing points 110. Each dispensing point 110 is individually controlled. The crop input applicator 100 has a cab 112, and located on top of the cab 112 is a global positioning system receiver 114. The cab 112 is also equipped with an on-board computer. The applicator 100 is capable of applying either dry crop inputs, such as fertilizer or seeds, or wet crop inputs, such as liquid insecticides, herbicides, fungicides, or liquid fertilizer.

The crop input applicator 100 is constructed with a wide boom 102 to aid in covering the most area possible in one pass. Some sort of indicator, either a foam marker or similar device, is used to allow the operator of an applicator 100 to determine which areas of the field have been covered. The indicators are not always adequate, however, and an operator may inadvertently skip an area by not getting the boom sections 104, 106 close enough to the area previously treated. In addition, as the applicator 100 traverses fields with irregular boundaries, or areas with waterway or terraces, the wide boom 102 may overlap areas previously covered, as discussed in connection with FIGS. 1A–1D.

The present invention solves the above problems with skips and overlaps because the on-board computer and an associated display are able to use location data from the GPS receiver 114 to aid the operator in directing the applicator. In doing so, a control system uses the location data from the GPS receiver 114 to create status maps indicating where the crop input applicator 100 has previously traveled during the current application of desired crop inputs. Location data is also used to compare the current position of applicator 100 to the status map. The inventive control system is then able to selectively deactivate the individual dispensing points 110 along the boom 102 so that areas in the field that have already been treated, or areas that it is not desirable to treat (waterways or streams), do not receive an application of crop inputs.

FIG. 2 illustrates how the present invention is put into practice as the crop input applicator 110 applies crop inputs to a land area. As the applicator 100 moves through an agricultural field in the direction indicated by the arrow 116, crop inputs are dispensed from the booms 104, 106. Shown in FIG. 2 is a typical land area to be treated with one or more crop inputs. The land area has a first portion 118 that represents a portion of the land area that has previously been treated with the crop input applicator 100. The land area also has a second portion 120 that represents that portion of the land area that has not yet been treated by the crop input applicator 100. A third portion 122 of the land area represents yet another portion of the land area that also is untreated. A stream 124 is shown running through the land area.

As the crop input applicator 100 moves through the field, the first boom section 104 applies crop inputs through dispensing points on that portion of the boom section 104A over the untreated land area 120. The dispensing points on the portion of the boom 104B that overlaps the previously treated land area 118 are automatically controlled so that no crop inputs are applied from that portion of the boom section 104B. Similarly, the second boom section 106 applies crop inputs from dispensing points on those portions of the boom 106A, 106C which overlap the untreated areas 120, 122. The portion of the boom 106B which overlaps the stream 124 is automatically controlled so that no crop inputs are applied from that section of the boom 106B.

It can be appreciated that as the crop input applicator 100 moves in the direction of the arrow 116, different portions of the boom sections 104, 106 are automatically deactivated when the dispensing points on the booms 104, 106 are over the treated land area 118 or the stream 124. Likewise, the dispensing points on the booms 104, 106 remain activated for those portions of the booms 104, 106 which are over land areas 120, 122 that have not yet been treated.

With some controllers, it is possible for growers to spontaneously respond to variation as they transverse a field. For example, a farmer may manually vary seed rates in a field based upon changes in soil tilth, cloddiness, the quantity of crop residue, or landscape position. Such manual variation can be very subjective and is adversely affected by operator fatigue. In addition, manual control is nearly impossible when the machine is traveling in areas containing waterways or terraces, or in fields with irregular boundaries. The present invention provides a status map, that when used in combination with a variable rate input controller, for an example, a FALCON® controller manufacture by Ag-Chem Equipment Company Inc., of Minnetonka, Minn., controls the applicator in a manner that prevents overlaps and minimizes skips. This mode of operation is achievable since the boom section or portion thereof, including each individual dispensing point, are computer controlled to accommodate the desired application patterns.

The location data used to create the status map comes from a locating system which is in communication with the data processing device. The locating system can be a satellite positioning system, such as AgNav™, Navstar Global Positioning System, Differential GPS systems, or any other GPS based or equivalent type of system. The data collected from the locating system is used to update a resident map data base in real time on the vehicle. This data is used to create the status map, and further is used to determine whether the applicator is overlapping or skipping an area.

As used herein, the following words have the following meanings. The word "enhance" means a process of developing refined data by using related data points in an existing data base to generate new data points based on extrapolation, interpolation, modeling, extension, or the like. In this way, the existing data base can be "enhanced". The word "synthesize" means to create an enhanced model from a set of geo-referenced data points. As used herein in relation to the use of data points from geo-referenced map information, to "synthesize" a status map means to create a status map data base, which includes new data points created by enhancing data points from the existing data base, so that an "enhanced" model is created. The words "algorithmic software" mean an algorithmic computer program used to direct the processing of data by a computer or data processing device. The word "geo-referenced" means data points or a map is created by using conventional positioning standards, such as a global positioning system (GPS).

The word "extracting" describes a device implemented mathematical process or a software directed computer process that selects data from a given set of data points based on a predefined criteria for selecting data. It follows that "data extraction" is a software directed or device implemented process of selecting data from a given set of data points based on a predefined criteria for selecting among the set. The word "expand" means to create new data points based on a parameter or parameters consistent with a selected group of existing data points. The word "software implemented" refers to the use of a software program on a particular computer system. Similarly, the words "computer implemented device" refer to the use of a computer system on a particular device. The words "discrete data" are interchangeable with "digitized data," and "digitized data" means data which is stored (e.g. electronically or magnetically) in the form of singularly isolated, discontinuous data or digits. The words "data processing device" refer to a central processing unit (CPU) and an interface system. The interface system provides access to the CPU such that data can be entered and processed by the data processing device.

Figure 3:
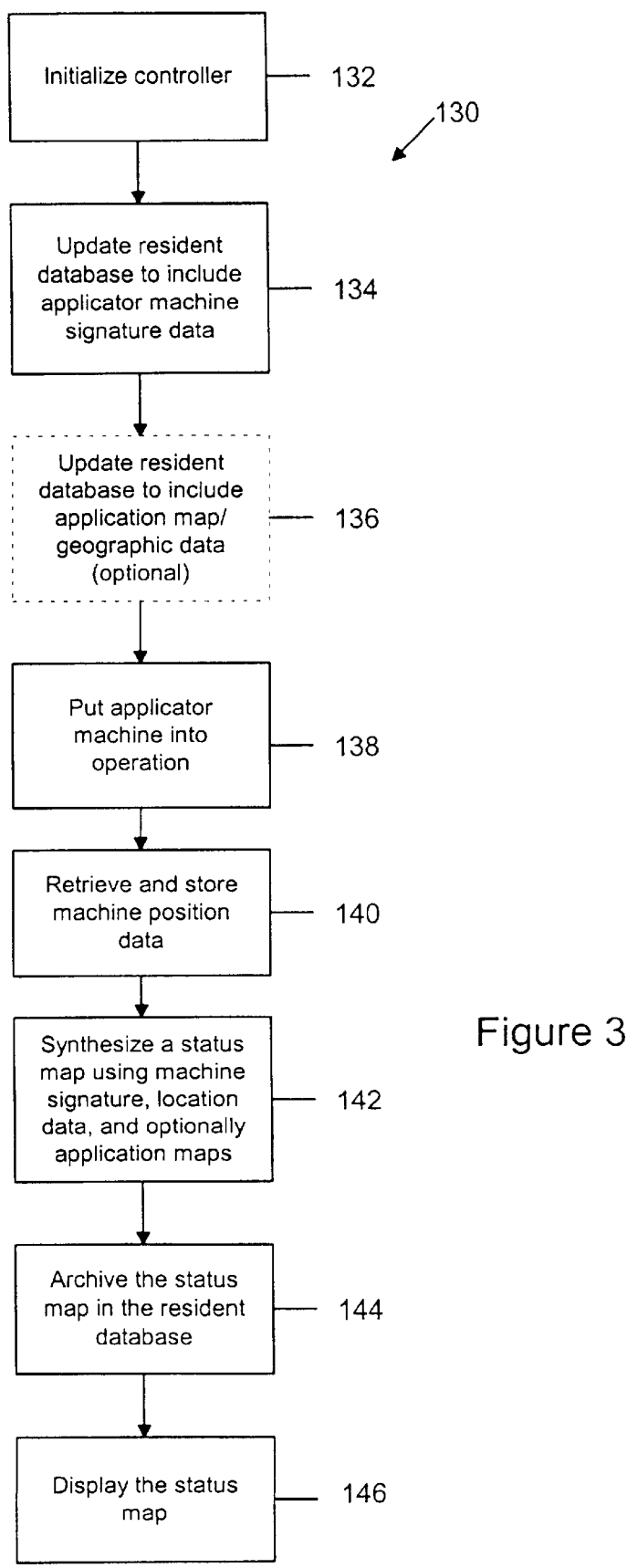
FIG. 3 is a flow diagram illustrating the steps involved in creating a status map.

To implement the present invention, the crop input applicator 100 must first generate a status map of the area already treated with crop inputs. The status map may be attached as an annex map, stored as a secondary image in a resident data base, or may even exist within a node within in a distributed control system. FIG. 3 is a flow diagram illustrating one embodiment of a process for automatically synthesizing a status map in real time suitable for use with the boom dispensing point control system.

The status map creation process 130 begins with first initializing the control system 132. The control system may be any controller suitable for the process, such as a FALCON® controller manufactured by Ag-Chem Equip-ment Company, Inc. of Minnetonka, Minn. The controller is both a computer system and a network of nodes with associated sensors and actuators. The computer system, usually an on-board computer, includes a resident database that is updated to include specific applicator machine signature data as shown in block 134. Machine signature data refers to that information that is unique to the particular applicator machine, such as the width of the boom, the location of individual dispensing points on the boom, the number and type of crop inputs storage devices, the number and type of transport mechanisms, including valves, pumps, motors, etc., and various process delay times associated with the flow of crop inputs when transported for the storage devices. A discussion of product application machine signatures is discussed in U.S. patent application Ser. No. 08/766,420, filed on Dec. 12, 1996 by Alvin E. McQuinn entitled *Delay Coordinating System for Agricultural Machines*; and U.S. patent application Ser. No. 08/940,345, filed on Sep. 30, 1997 by Alvin E. McQuinn entitled *Multi-Variable Rate Dispensing System for Agricultural Machines*, both assigned to Ag-Chem Equipment Company, Inc. of Minnetonka, Minn. and incorporated in their entirety by reference herein.

Application map data from one or more application maps associated with the field or area to be treated with crop inputs may optionally be added to the data base as shown in block 136. Application maps are maps containing site specific data and the corresponding recommendations as to the prescription of nutrients or crop inputs to be applied. The application maps are used in connection with the controller to variably apply crop inputs based on site specific data. Loading an application map into a user definable area allows for real time plotting of the vehicle location with respect to the map to indicate those management zones or portions thereof that have previously been treated by the vehicle. Once the vehicle is in position, the GPS is synchronized with a corresponding location on the map. Thus, as the vehicle is operated around the field, crop inputs can be applied based on the application map (and status map information) supplied by the present method and apparatus.

Geographic data may also optionally be included in the resident database, either as part of the application map, or as a separate map. The geographic data may include such things as geographic areas where no crop inputs should be applied, such as streams, rivers, wells, or other bodies of water, parks, nature areas, and residential areas. The geographic data may also include information as to the geology of the land area, such as terraces or steep hillsides where crop input application will be affected. To further refine the geographic information used as part of the application map, buffers may be created surrounding the geographic areas. In the buffer areas, crop input application would be deactivated or reduced when the applicator approaches bodies of water, wells, nature areas, or residential areas.

Next, the crop input applicator is put into operation as shown in block 138. As the crop input applicator operates, the controller, the GPS system, and speed sensor devices associated with the vehicle are also put into operation as the vehicle transverses the area to be treated. As the specific applicator machine operates to apply crop inputs, machine position data is retrieved and stored in a database, as shown in block 140. As mentioned above, when done in connection with an application map, the machine position data can be plotted in real time on the application map. When not done in connection with an application map, the controller collects machine position data and generates a real time status map based on the change of the machine's position over time and the width of the crop input applicator. A pass around the perimeter of the field may be used to establish a field boundary.

The applicator machine signature data, the position data, and optionally application map data and geographic data are all used by the controller to synthesize an enhanced map, thus creating a status map as shown in block 142. The status map depicts the cumulative swath path of the vehicle after the application of crop inputs. The status map may optionally depict any relevant geographic data, such as bodies of water, residential areas, or terraces. In effect, the status map is a real time indication of the ,round that has been covered by the applicator and treated with crop inputs. The status map is archived as a layer of data and is stored in the resident database, as shown in block 144. It is also possible to display the status map visually via a display mechanism, such as a computer screen, or other similar display screen, a light bar, or several lighted switches, as shown in block 146. Using, the display, an operator can see in real time the application of crop inputs. In this manner, the operator can control the crop input applicator to prevent and minimize skips between the current swath and the previous swath.

Figure 4:
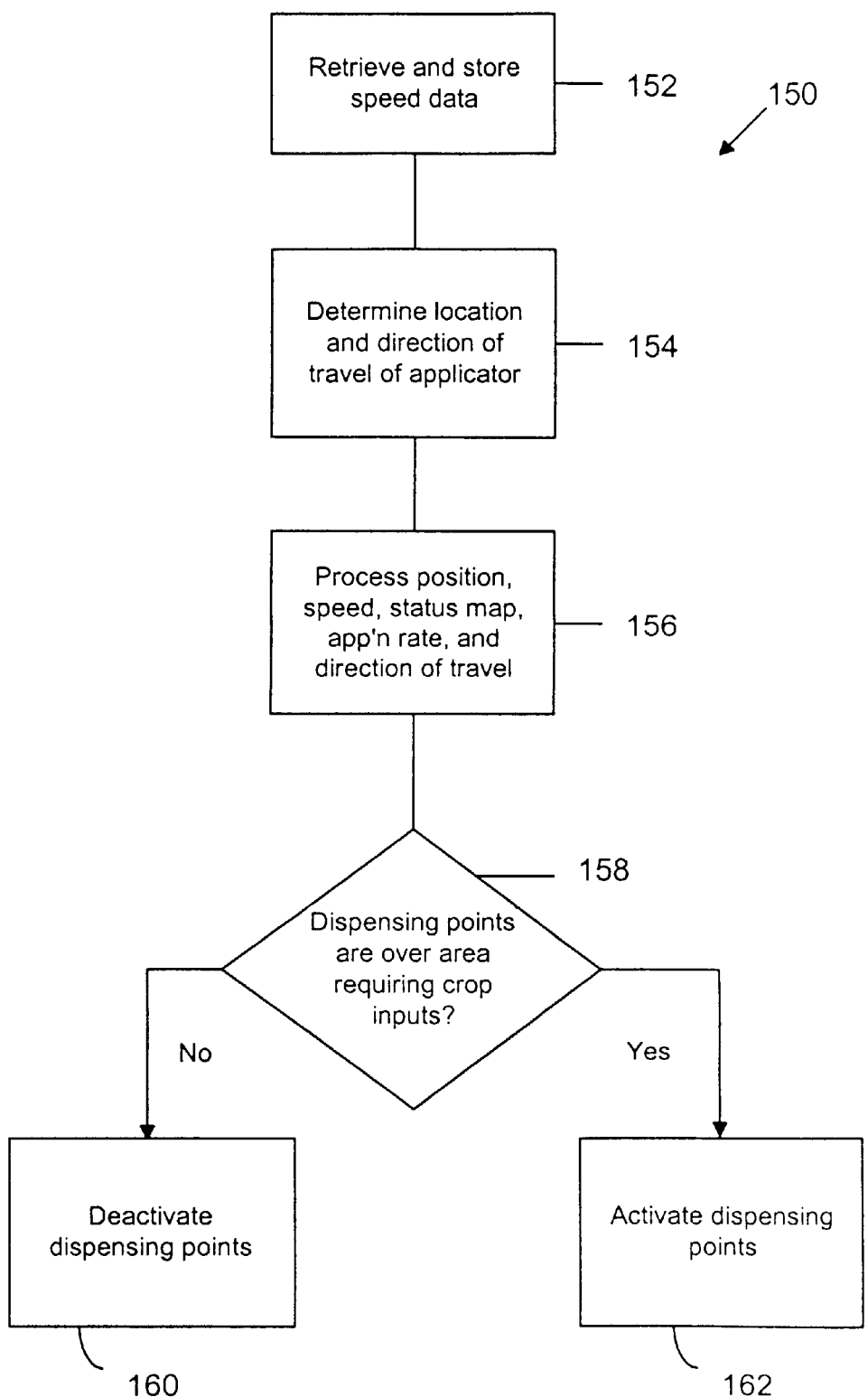
FIG. 4 is a flow diagram illustrating the steps involved in controlling dispensing points on a crop input applicator based on a status map.

FIG. 4 depicts an algorithmic software flow chart illustrating one embodiment of a process 150 for controlling the dispensing point control system based on the status map generated by the process 130 shown in FIG. 3. The speed at which each boom dispensing point is moving at any moment in time is important to determining whether a respective dispensing point should be activated or deactivated. Thus, as shown in block 152, boom dispensing point speed data is retrieved and stored in a data base for use by the computer in real time as the applicator machine traverses the field or area to be treated. The speed data can be retrieved using the GPS system, or using more conventional methods such as through speed sensors on the applicator machine or radar. In addition, the location and direction of travel associated with each boom dispensing point related to the status map is also determined as shown in block 154. Both the location and direction of travel can be determined using the GPS system.

The foregoing position, speed, direction of travel data, status map, and optionally an application map and geographic data are then processed by the computer as shown in block 156. Next, the computer determines whether the boom dispensing point is over an area or areas that requires treatment as shown in block 158. As shown in block 160, if the dispensing points are over an area that does not require treatment, such as an area previously treated, an area outside the field boundary, or an area close to a body of water, those dispensing points are deactivated. If, however, the dispensing point is over an area that requires treatment, those dispensing points remain activated, as shown in block 162.

Figure 5:
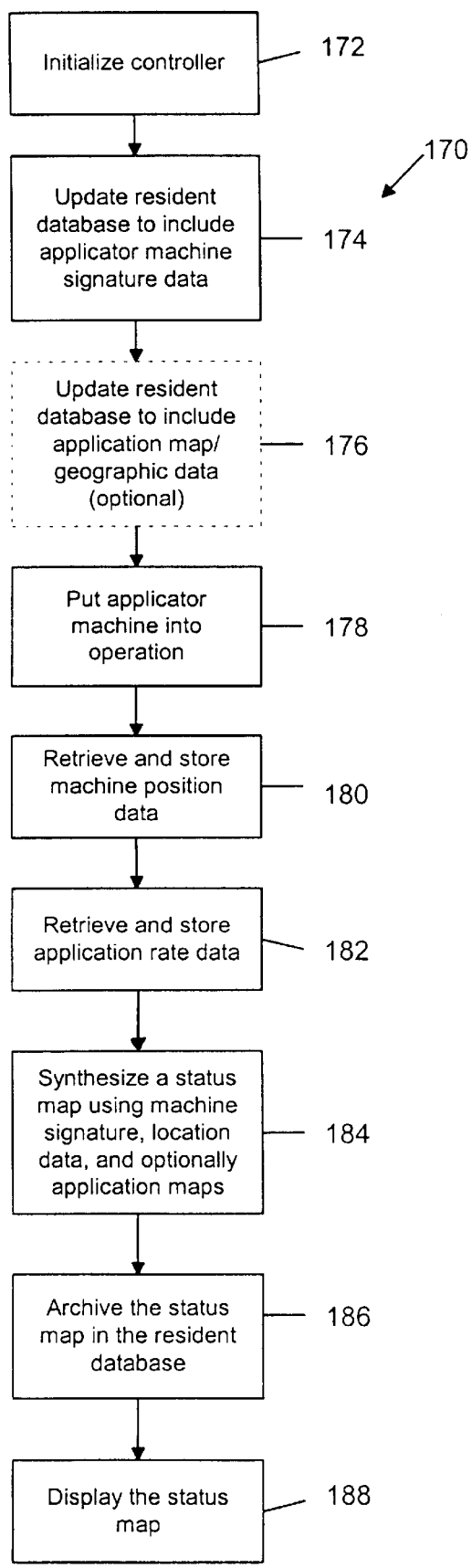
FIG. 5 is a flow diagram illustrating another embodiment of the steps involved in creating a status map.

FIG. 5 is a flow diagram illustrating another embodiment of a process 170 for automatically synthesizing a status map in real time suitable for use with a dispensing point control system. The process 170 begins in a similar manner to that described above by initializing the control system 172. Once again, the control system comprises a suitable controller. The controller is preferably an on-board computer system with a resident database, and a network of nodes with associated sensors and actuators. In the next step 174, the resident database is updated with machine signature data. Machine signature data may include boom width, location of individual dispensing points, the number and type of crop input storage devices, the number and type of transport mechanisms, and process delay times, as explained more fully above. An application map (showing the desired amount and location of crop inputs) or geographic data (delineating wetlands, residential areas, or other sensitive areas) may also be optionally added to the resident database 176. The crop input applicator is put into operation 178 and the position of the applicator is retrieved from an associated locating system and speed sensors and is stored in the resident database, as shown in block 180.

In the present embodiment, application rate data is also collected and stored, as shown in block 182. Application rate data refers to the amount of crop inputs being applied by the applicator. This data can be collected by flow meters and sensors at the dispensing points, or may be collected by sensors at crop input storage bins on the applicator. Information from the sensors is related to the controller, which uses the sensor data to determine an application rate of crop products as the applicator moves through the field.

The machine signature data, position data, application rate data, and optionally application map and geographic data are then used by the controller to synthesize an enhanced map, thus creating a status map as shown in block 184. The status map depicts not only the cumulative swath path of the vehicle after the application of crop inputs, but also depicts the amount of crop inputs applied. The status map is archived as a layer of data and is stored in the resident database, as shown in block 186. It is also possible to display the status map visually via some type of display device 188. One such display device would be a computer screen capable of displaying colors, with different colors depicting the varying amounts of crop inputs applied. Other similar display devices, such as monochrome display screens, are likewise suitable.

Figure 6:
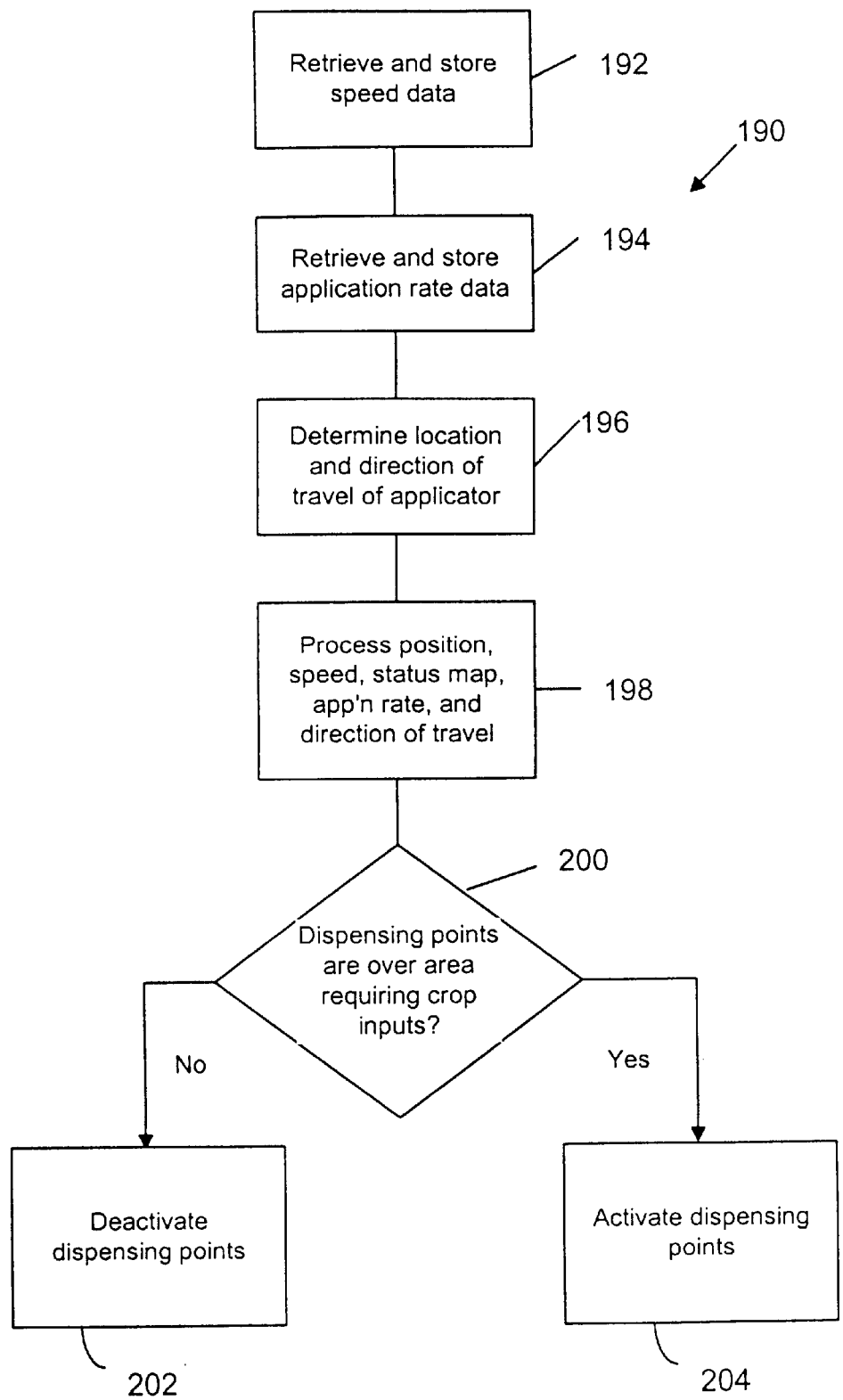
FIG. 6 is a flow diagram illustrating another embodiment of the steps involved in controlling dispensing points on a crop input applicator based on a status map showing application rates.

FIG. 6 depicts an algorithmic software flowchart illustrating a process 190 for controlling the dispensing points on a crop input applicator based on a status map showing application rates. Dispensing point speed data is collected and stored in a database for use by the computer in real time as the applicator traverses the field 192. This speed data may be collected by using a GPS system, radar, or using, conventional speed sensors. In addition, the location and direction of travel of the dispensing points related to the status map are determined, as shown in block 194. In addition to speed, direction, and location, the controller collects and stores application rate data as well, as shown in block 196.

The next step is to process the position, data, status map, direction of travel, and application rate data 198. Once the data is processed, the controller determines whether the dispensing points are over an area requiring the application of crop inputs 200. In determining whether an area requires crop inputs, the controller compares the present position of the applicator and dispensing points to the status map. When a status map is created that contains application rate data in addition to machine signature and location data, the resulting status map not only indicates where the applicator has applied crop inputs, but also the amount of crop inputs applied. Thus, if any dispensing points are over areas previously treated, the controller must further determine whether the area requires further treatment. If not, the dispensing points are deactivated, as shown in 202. If the area requires more crop inputs, the dispensing points are activated, as shown in 204.

Controlling the application of crop inputs based on application rate data is useful because crop input applicators have limitations as to the amount of crop inputs the applicator can apply. For instance, there may be a maximum rate at which the applicator can apply crop inputs. In addition, an operator may set a maximum rate at which the crop input applicator is desired to apply crop inputs due to machine constraints, weather conditions, or other reasons. This maximum rate may be lower than the amount of crop inputs desired to be applied. By collecting application rate data, the applicator can be controlled such that when the applicator is over an area that has received the desired amount of crop products, the dispensing points are deactivated. When the applicator is over an area previously treated with crop inputs, but not enough crop inputs were applied, the applicator can reapply crop inputs to reach the desired application amount.

Figure 7:
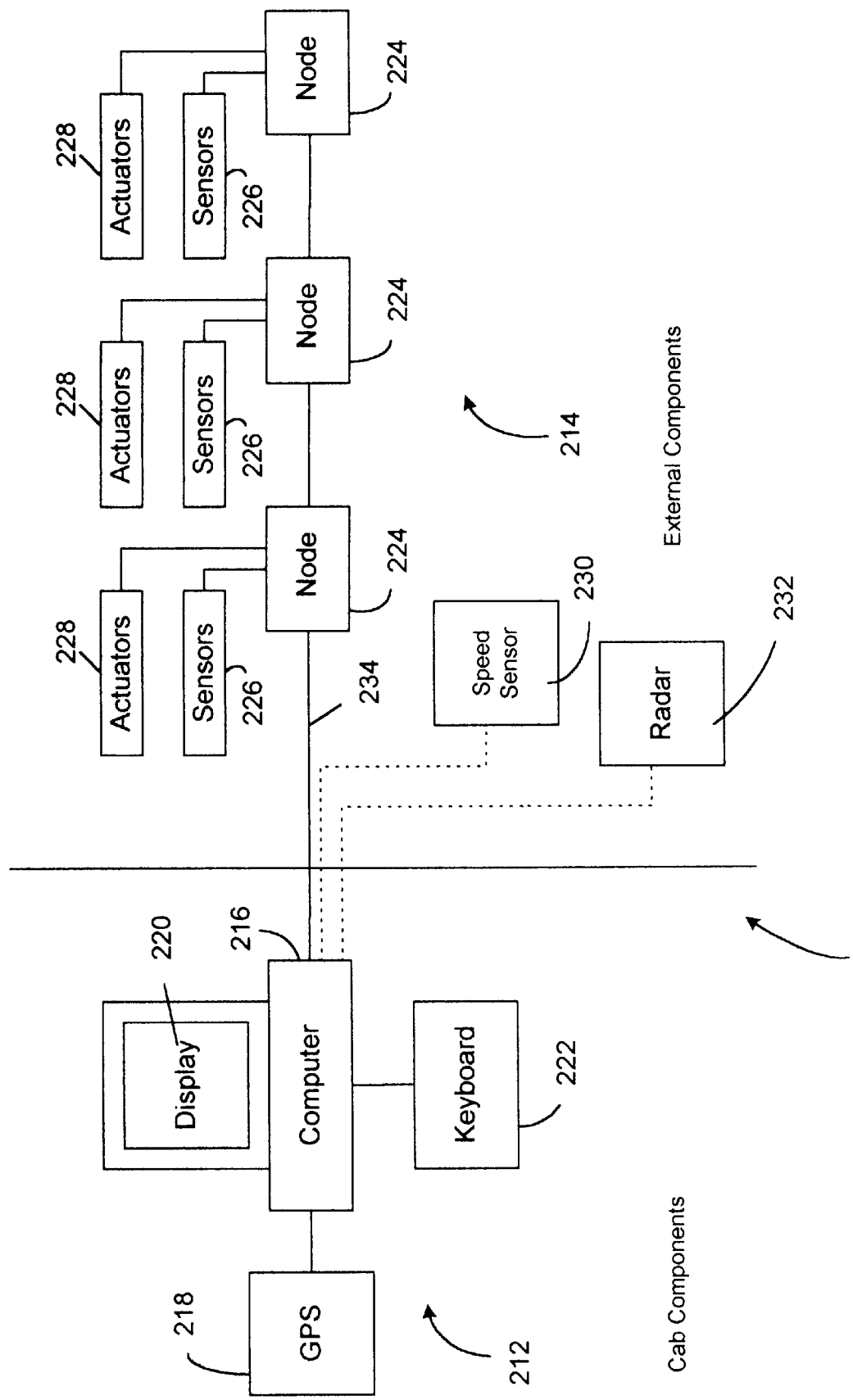
FIG. 7 is a diagrammatic representation of a control system architecture suitable for the present invention.

The dispensing points oil the crop input applicator are activated and deactivated by the control system. FIG. 7 is a diagrammatical view of a distributed control system 210 particularly suited for implementing the present invention. Shown in FIG. 7 are cab components 212 and external components 214. The cab components 212 include a compacter 216, a GPS receiver 218, a display screen 220 and keyboard 222. The external components are several nodes 224 with associated sensors 226 and actuators 228. Other optional external components include a speed sensor 230 and a radar mechanism 232. Each of the nodes 224 are connected to the on-board computer 216 via a two wire strand 234.

The cab components 212 are configured so that the keyboard 222, the display device 220, and the GPS receiver 218 are connected to the computer 216. The on-board computer 216 receives location data from the GPS receiver 218. The computer 216 also stores site specific data, usually in the form of one or more application maps. The external components 214 are connected to the on-board computer 216 via a two wire strand 234, or other suitable wire or cable. The on-board computer 216 is thus able to communicate location and application map data to each node 224 through the wire strand 234.

Each node 224 is capable of two way communication between the computer 216 and the nodes' 224 corresponding actuators 228 and corresponding feedback sensors 226. The nodes 224 control one or more actuators 228, which may be valves, electric motors, conveyor belts, nozzles, pumps, meters, or other similar devices, and the nodes 224 also receive feedback through one or more sensors 226. There are as many nodes 224 as are necessary to control each dispensing point on the applicator machine. Thus, a node 224 may exist for each dispensing point, or a node 224 may control a group of dispensing points.

Each node 224 has a microprocessor which can be programmed to control the nodes 224 corresponding actuators 228 and sensors 226. The microprocessors also allow the nodes 224 to receive data related to both the map data stored on the on-board computer 216 and the location data received from the GPS receiver 218. In this manner, the computer 216 acts merely as a supervisor, with the nodes 224 acting in an autonomous fashion in controlling their corresponding actuators 228. This gives rise to one of the benefits of a distributed control system 210; the only wiring required in the cab is the two wire strand 234. All the other wiring is external to the cab, occurring at the nodes 224. This greatly simplifies the wiring and makes trouble shooting and maintenance much easier.

When used in connection with the present invention, the distributed control system 210 is capable of activating and deactivating individual dispensing points based on the status map data and location data. More specifically, the crop input applicator receives GPS data via the GPS receiver 218 and uses that information in combination with other data, such as applicator machine signature data, to construct a status map using the method described above. The on-board computer 216 compares the present position of the applicator, as determined using the GPS receiver 218, to the status map and controls the dispensing points based on the comparison by sending instructions to each node 224. Each node 224 then uses the actuators 228 to either apply crop inputs from the dispensing points, or prevent crop inputs from being applied from a dispensing point.

In one embodiment, the on-board computer 216 comprises operating software with a subdirectory that functions as a host system and interface, a net utility system that functions as a network utilities and diagnostics software, network firmware in which a downloadable Neuron C® code resides, and GPS interface system that is a dedicated section of the operating software dealing with GPS data reception and processing. The on-board computer 216 is most preferably a FALCON® controller. The FALCON® controller is most preferably configured to function within a distributed network, such as an Echelon™ or CANS™ distributed network. In this way the FALCON® controller can function without the attendant problems of a communications system such as normally associated with centralized control systems familiar to those skilled in the art. Specifically, a typical top down programming effect for a centralized control system may dedicate at least 60% of the program code to communications. In a distributed network system this problem becomes much more critical because the system must hand shake with numerous controllers rather than just a single location. In one known embodiment, Echelon™ systems contain three microprocessors on the independent controller board. Two of these processors are dedicated to handling all trans-missions and communications on the network. Thus, the network is self-managing and this minimizes communication problems. The third processor is available to the user for control systems use. In this particular embodiment, all nodes 224 are programmed in Neuron C®.

Though presented in terms of being automatic in that the controller automatically controls the dispensing points based on instructions from the on-board computer, the present invention is not so limited. Each boom dispensing point node 224 can be controlled manually by the applicator machine operator with reference to the status map. One method of achieving this is to display the status map on the display mechanism 220 in the cab of the applicator machine, other methods include using light bars, or several lighted toggle switches. In addition, the present inventive process can be used to control individual boom dispensing point nodes 224 even without the use of application maps since only the status map is necessary for the applicator machine operator to determine which boom dispensing points require crop inputs to be dispensed therefrom. In this manner, the applicator machine operator can control individual boom dispensing points or combinations of boom dispensing points to accurately dispense the desired crop inputs. The present invention is suitable for use with planters, sprayers, toolbars, or other similar crop input applicators, to accommodate application of a variety of crop inputs, such as seeds, bulbs, chemicals, fertilizers, insecticides, herbicides, or any other crop input.

Although the present invention has been described with reference to preferred embodiments, workers skilled in the art will recognize that changes may be made in form and detail without departing from the spirit and scope of the invention.

What is claimed is:

1. A crop input applicator dispensing point control system, the system comprising:
   a crop input applicator having a plurality of crop input dispensing points wherein each dispensing point is individually controlled;
   a locating system for providing location data; and
   a control system which creates a, real time status map indicating an area treated with crop inputs for an application job and controls an application of crop inputs from the dispensing points as a function of the status map and location data to prevent an application of crop inputs over an area previously treated with the crop inputs during the same application job.

2. The system of claim 1 wherein the dispensing points are located along a spray boom.

3. The system of claim 1 wherein the dispensing points are located along a toolbar.

4. The system of claim 1 wherein the dispensing points are located alone a drill.

5. The system of claim 1 wherein the locating system is a global positioning system.

6. The system of claim 1 and further comprising a visual display of the status map.

7. The system of claim 1 wherein the applicator is configured to deliver dry crop inputs.

8. The system of claim 1 wherein the applicator is configured to deliver liquid crop inputs.

9. The system of claim 1 and further comprising a plurality of actuators configured to receive control signals initiated via the control system such that activation of any actuator enables dispensing of selected crop inputs from a respective dispensing point and further such that deactivation of any actuator disables dispensing of selected crop inputs from a respected boom dispensing point.

10. The system of claim 1 wherein the status map is created using machine signature data and location data.

11. The system of claim 10 wherein the status map is created using geographic data.

12. The system of claim 10 wherein the status map is created using an application map.

13. The system of claim 10 wherein the status map is created using application rate data.

14. The system of claim 1 wherein the status map further indicates geographic data.

15. The system of claim 1 wherein the status map further indicates application rate data.

16. A method for controlling dispensing points on a crop input applicator to prevent overlaps and skips, the method comprising:
   sensing position of the applicator in a field;
   maintaining status data indicating a land area over which crop inputs have been dispensed during an application job; and
   controlling the dispensing points on the applicator as a function of the status data to achieve a desired application amount of crop inputs over an area previously treated with crop inputs during the same application job.

17. The method of claim 16 wherein status data further includes geographic data.

18. The method of claim 16 wherein status data further includes application rate data.

19. The method of claim 16 wherein the position is sensed by a global positioning system.

20. The method of claim 16 wherein the crop inputs dispensed are dry crop inputs.

21. The method of claim 16 wherein the crop inputs dispensed are liquid crop inputs.

22. The method of claim 16 wherein the crop inputs are dispensed from a spray boom.

23. The method of claim 16 wherein the dispensing points are controlled as a function of the status data to prevent an application of crop inputs over an area previously treated with the crop inputs.

24. The method of claim 16 and further comprising displaying the status data on a display screen.

25. A method for preventing skips and overlaps in applying crop inputs, the method comprising:
   tracking a location of a crop input applicator machine as it applies crop inputs and storing resulting location data;

creating a status map indicating an area treated with crop inputs using the location data and machine signature information and storing the resulting status map;

displaying the status map on a display screen;

determining a position the machine will be in using speed data and the location data;

comparing the position the machine will be in to the status map and determining whether a portion of the machine will traverse an area requiring application of crop inputs; and deactivating a portion of the crop input machine traversing an area not requiring application of crop inputs.

26. The method or claim 25 wherein the status map is created using application maps.

27. The method of claim 25 wherein the status map is created using geographic data.

28. The method of claim 25 wherein the status map is created using application rate data.

29. The method of claim 25 wherein tracking the location of a crop input applicator is done with a global positioning system.

30. A crop input applicator machine, the machine comprising:

a plurality of dispensing points located on the machine, wherein each dispensing point is individually controllable;

a location system for determining a position of the machine in a field; and a control system which creates a status map and controls the application of crop inputs from the dispensing points as a function of location data received from the location system and the status map so that crop inputs are not re-applied over an area previously treated with crop inputs.

31. The crop input applicator machine of claim 30 wherein the locating system is a global positioning system.

32. The crop input applicator machine of claim 30 and further comprising a display screen for displaying the status map.

33. The crop input applicator machine of claim 30 wherein the machine is configured to apply liquid crop inputs.

34. The crop input applicator machine of claim 30 wherein the machine is configured to apply dry crop inputs.

35. The crop input applicator machine of claim 30 wherein the application of crop inputs is controlled to reapply crop inputs over an area previously treated when the previous treatment was less than a desired amount.

\* \* \* \* \*